United States Patent [19]

Speranza et al.

[11] Patent Number: 5,179,175

[45] Date of Patent: Jan. 12, 1993

[54] POLYAMIDES FROM POLYETHERAMINES, HEXAMETHYLENE DIAMINE AND ADIPIC ACID

[75] Inventors: George P. Speranza, Austin; Donald H. Champion, Pflugerville, both of Tex.

[73] Assignee: Texaco Chemical Company, White Plains, N.Y.

[21] Appl. No.: 627,468

[22] Filed: Dec. 14, 1990

[51] Int. Cl.$^5$ .............................................. C08L 77/00
[52] U.S. Cl. ...................................... 525/432; 525/420
[58] Field of Search ........................................ 525/432

[56] References Cited

U.S. PATENT DOCUMENTS

| | | | |
|---|---|---|---|
| 3,556,927 | 5/1968 | Sommer et al. | 525/432 |
| 4,136,133 | 1/1979 | Thompson | 260/857 |
| 4,374,741 | 2/1983 | Rieder | 252/34 |
| 4,713,437 | 12/1987 | Pilz et al. | 528/336 |
| 4,740,582 | 4/1988 | Coquard et al. | 528/339.3 |

*Primary Examiner*—Ana L. Carrillo
*Attorney, Agent, or Firm*—Jack H. Park; Kenneth R. Priem; Cynthia L. Kendrick

[57] ABSTRACT

Disclosed is a method for reducing compatibility problems when introducing a polyetheramine having a molecular weight of about 100 to 1000 into a nylon-6,6 polymer by prereacting the polyetheramine with two moles of adipic acid and reacting the adipic acid salt with nylon-6,6 and adipic acid.

7 Claims, No Drawings

POLYAMIDES FROM POLYETHERAMINES, HEXAMETHYLENE DIAMINE AND ADIPIC ACID

BACKGROUND OF THE INVENTION

1. Technical Field of the Invention

This invention relates to the preparation of polyamides from polyetheramines, hexamethylene diamine and adipic acid and more particularly it relates to altering the structure of nylon-6,6 to form an elastomeric nylon-6,6 based polymer by the introduction of higher molecular weight polyetheramines into nylon-6,6 polymers over a wide concentration range in order to improve impact resistance. In particular, this invention deals with overcoming compatibility problems inherent in adding high molecular weight polyetheramines into nylon-6,6.

2. Related Art

Ever since the development of nylon-6,6 by DuPont in the late 30's, there have been attempts to modify these polymers. An early patent (U.S. Pat. No. 2,359,867) describes the substitution of a portion of the hexamethyl diamine with triethylene glycol diamine.

In British Patent 562,370, Jun. 29, 1944 to I.C.I. polytriethylene glycol adipamide was mixed with hexamethylene adipimide to prepare modified nylon-6,6. The purpose of these modifications was to improve the moisture absorption properties of the polymer and the wearing comfort of the fabric and to increase the uses for nylon-6,6.

Other modifications of the nylon-6,6 molecule include the preparation of filaments with high elasticity and polymers with improved impact resistance and elasticity. U.S. Pat. No. 3,044,987 to DuPont (Jul. 17, 1962) describes the introduction of a polyether into the preparation of high molecular weight polyesteramides.

In U.S. Pat. No. 4,130,602 to Thompson et al., there is a disclosure of a novel block copolymer consisting of a specified polyamide and a specified poly(dioxamide) wherein it is noted that the incorporation of the poly(dioxa-amide) into polyamide does not adversely affect the desirable properties of the polyamide. Another patent to Thompson, U.S. Pat. No. 4,136,133, discloses a novel composition which is a block copolymer of a polyamide comprising a melt spinnable polyamide having no ether linkages. The fiber has the desirable properties of the major constituent, nylon-6,6, but also has superior absorption properties.

In U.S. Pat. No. 4,217,324 to Meeks, there is disclosed a method of making an antifriction nylon member comprising providing molten nylon monomers in two containers and mixing a liquid lubricant and a surfactant in the second container to form a homogeneous mixture, blending the mixture of the second container with that of the first to effect polymerization and defining a blend wherein said lubricant is substantially uniformly dispersed throughout the resulting molten nylon.

Impact resistant thermoplastic polyamides which are especially well suited for use as hot melt adhesives are disclosed in U.S. Pat. No. 4,320,213. They include polyamide forming moieties and polyamide forming oligomer moieties. In this patent, there is disclosed a composition comprising the product of melt-blending a polyamide resin, a hydroxyl-functional elastomer and a succinic-functional coupling agent, wherein the coupling agent provides effective coupling of the elastomer to the polyamide. This polyamide molding resin is suitable for molding into high impact resistant forms.

The invention of U.S. Pat. No, 4,374,741 is a novel lubricant for use in forming a stable, lubricating aqueous functional fluid which comprises a polyoxyalkylene polyamide lubricant having a terminal carboxylic acid group and a terminal amine group in the same molecule.

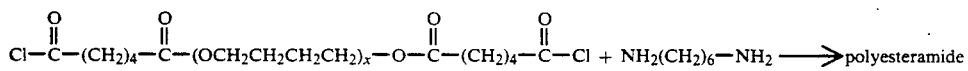

It is useful in metal working and hydraulic fluids.

The object of U.S. Pat. No. 4,713,437 is to provide salts of dicarboxylic acids and oxyalkylenediamines which better satisfy the set requirements with regard to their characteristics. In particular, the periodate number and UV number of the salts after heat treatment along with other characteristics make it possible to produce nylons of improved quality. These compositions comprise a salt of an oxyalkylendiamine, an alkane-dicarboxylic acid and hydrazine.

In U.S. Pat. No. 4,868,280, there is disclosed a novel grade of copolyimides or tetramethylene adipamide (nylon 4,6) and tetramethylene terephthalamide (nylon 4,T) containing a mole fraction of nylon 4,T of 0.1 to 0.6 and having such a degree of orientation that the melting temperature shows little dependance on the composition of the copolyamide and remains relatively low. The copolyamides have good mechanical properties.

U.S. Pat. No. 3,044,987 is directed toward the attempt to introduce a polyether into a high molecular weight polyamide. Most of the related art deals with modifications to polyamides other than nylon-6,6 and to difficulties encountered with modifications.

In an article entitled "Segmented block Copolymers based on polyamide-4,6 and poly(propylene oxide)" by van Hutton, et al., *Polymer*, 1990, Vol. 31, March, p.

In U.S. Pat. No 3,454,534, there is claimed the addition of a polyether having a molecular weight of at least 1000 of the formula: $NH_2(CH_2)_3\text{-}O\text{-}(RO)_x\text{-}(CH_2)_3\text{-}NH_2$ into the nylon-6,6 molecule. The concentration of the polyethers was 0.3 to 3% and R contained 2 to 8 carbon atoms.

There is disclosed in U.S. Pat. No. 4,044,071 a process for forming a blocked polyamide copolymer which comprises mixing a molten melt spinnable polyamide and a dry salt selected from the group consisting of specified prepolyamides and heating and mixing the mixture until substantially all of the salt and the polyamide are converted. Related U.S. Pat. No. 4,045,511 discloses a similar process for forming a block polyamide copolymer which involves dry blending a prepolyamide and particles of a melt-spinnable polyamide.

The invention of U.S. Pat. No. 4,113,794 is a normal copolymer formed by melt blending a melt spinnable polyamide, such as nylon-6,6 and a block of random poly(dioxa-amide). The block is derived from a copolymer prepared from a mixture of caprolactam, the salt of adipic acid and 4,7-dioxadecamethylene diamine. The resulting fiber has moisture absorption characteristics similar to that of cotton.

524, there is a discussion of work performed by the authors wherein they allowed Jeffamine amines to react with adipic acid in the presence of nylon-4,6 salt. This reaction can be represented by the equation:

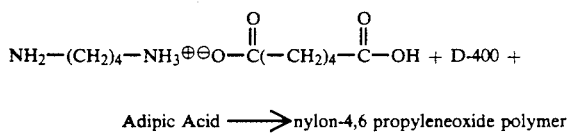

Adipic Acid ⟶ nylon-4,6 propyleneoxide polymer

One disadvantage of the work by van Hutton et al. is the lack of control over the amount of propylene oxide mixed into the polymer.

It would be very advantageous if a method were available which reduced the difficulties inherent in introducing a polyether into nylon-6,6 in particular. In addition, it would be advantageous to those skilled in the art if the amount of polyether could be varied. A process which facilitated the production of a homogeneous copolymer would be very desirable in the art.

In addition, if such a process resulted in novel nylon-6,6 based polymers having modified structures which incorporated polyoxypropylene diamines, polybutylene glycol diamines, aminopropyl polytetramethylene glycol diamines and polytetramethylene glycol diamines, and these polymers exhibited improved impact resistance, the usefulness of such modifications would be obvious to those skilled in the art.

It is the purpose of the instant work to describe the preparation of nylon-6,6 polyamides which have been modified by a high percentage of hydrophobic polyethers. The types of polyethers claimed are described as follows:

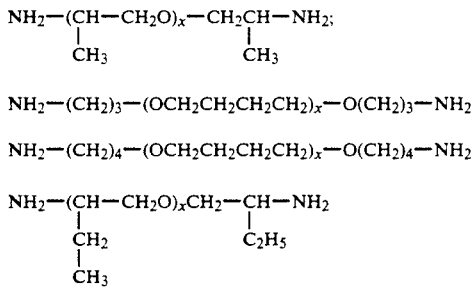

where x has a value of greater than 2 and less than 30.

Since these polyether diamines have a reactivity that is different from hexamethylene diamine the homogeneous copolymers of the invention are prepared by first preparing the adipic acid amide of the polyetheramine.

SUMMARY OF THE INVENTION

This invention provides a method for introducing higher molecular weight polyetheramines into nylon-6,6 polymer over a wide concentration range in order to improve impact resistance.

The problem of incompatibility of polyether amines with nylon-6,6 noted in related art is overcome by pre-reaction of the polyether amines with two moles of adipic acid. In the instant invention the adipic acid amide is copolymerized with hexamethylene diamine and adipic acid.

DETAILED DESCRIPTION OF THE INVENTION

This invention discloses a method for overcoming the problems inherent in introducing higher molecular weight polyether amines into nylon-6,6 polymers.

In the narrower and more preferred practice of this invention the adipic acid amide is copolymerized with hexamethylene diamine and adipic acid.

The polyethers which are used in the instant invention as the starting material to modify the nylon-6,6 polyamides are hydrophobic polyethers which can be described as follows: polyoxypropylene diamines of the formula

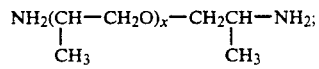

aminopropyl polytetramethylene glycol diamines of the formula

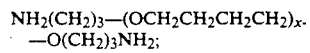

polytetramethylene glycol diamines of the formula

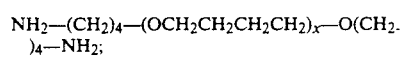

and polybutylene glycol diamines of the formula

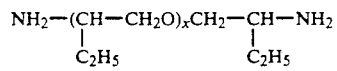

where x has a value greater than 2 and less than 30.

Another component of the instant invention is a melt spinnable polyamide. This means a polyamide which is crystallized and has at least 30° C. difference between melting point and the temperature at which the molten polymer undergoes decomposition. Examples of melt spinnable polyamides are: nylon-6,6 (also known as poly(hexamethylene adipamide)); nylon-6,10 (polyhexamethylene sebacamide); nylon-6(poly(pentamethylene carbonamide)); nylon-11(poly(decamethylene carbonamide)); MXD-6 (poly(metaxylene adipamide)); PACM-9 (bis(4-aminocyclohexyl) methane azelamide); PACM-10 (bis(4-aminocyclohexyl) methane sebacamide); and PACM-12 (bis(4-aminocyclohexyl) methane dodecanoamide); others are listed in ENCYCLOPEDIA OF POLYMER SCIENCE AND TECHNOLOGY, Vol. 10, Section "Polyamide Fibers", table 12. Methods for preparing these polyamides are well known and described in numerous patents and trade journals.

In the instant invention, the polyamide employed is nylon-6,6 or poly(hexamethylene adipamide).

Because these polyether diamines have a reactivity that is different from hexamethylene diamine, inclusion of them in nylon-6,6 is difficult because of compatibility problems. In the instant invention, it has been found that this problem can be overcome by first preparing the adipic acid amide of the polyether in order to make a homogeneous copolymer.

The method of the instant invention allows greater control over the amount of polyetheramine added into the polymer. In the method of the instant invention, first the Jeffamine amine is essentially tied up with adipic acid (I) which can be represented by the following:

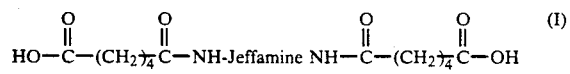

Then (I) is allowed to react with hexamethylene diamine to form the blocked polyamide:

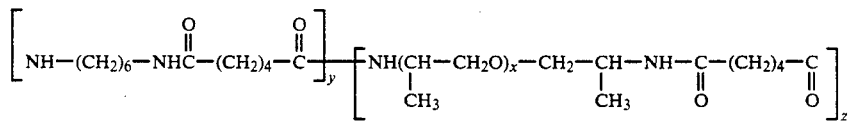

(I)+NH$_2$(CH$_2$)$_6$—NH$_2$→Blocked Polyamide

An especially desirable feature of this invention is that the amount of polyether in the blocked polyamide can be varied by adding adipic acid-hexamethylene diamide salt along with (I) and a stoichiometric amount of hexamethylene diamine.

The aspect of this invention which involves "tying up" the Jeffamine by prereacting with adipic acid does not, however, lend itself as well to higher molecular weight polyetheramines such as, for example, Jeffamine amine® D-2000. D-2000 is a polyoxypropylene diamine of the formula NH$_2$CH(CH$_3$)CH$_2$—[OCH$_2$CH(CH$_3$)]$_x$—NH$_2$ (II)

having a molecular weight of about 2000. The method works best for molecular weights of 190 to 1000 and works especially well for polyetheramines having a molecular weight of about 400. Examples 2-7 demonstrate particularly desirable results using Jeffamine amine D-400 having formula (II) where x is about 5.6.

The polymerization of adipic acid with hexamethylene diamine and polyoxypropylene diamines of the formula

to form homogeneous products where x has a value of about 5 or greater is difficult. It has now been discovered that the problem can be overcome in many cases by the prereaction of such products with adipic acid.

The process involves preparation of the adipic acid adduct of the polyether amine. This is accomplished by combining 2 moles of adipic acid with the desired polyether amine to form an amide represented by:

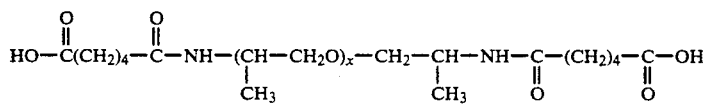

Subsequently the adipic acid adduct is heated with the hexamethylene adipimate or nylon-6,6 salt and a stoichiometric amount of hexamethylene diamine.

When (I) is heated with HMDA and adipic acid the product is a homogeneous copolymer. The copolymerization of this adipic acid amide with hexamethylene diamine and adipic acid has not been utilized previously.

The reaction takes place in a pressure range of about 0.1 mm to several atmospheres and a temperature range of from about 240° C. to 320° C. The preferred temperature is around 260° C. Heating is required for a period of up to about 5 hours. Under most conditions sufficient heating is accomplished in about 2-4 hours.

A product of this method is a copolymer which can be represented by the structure:

$$\left[ NH-(CH_2)_6-NHC-(CH_2)_4-C \underset{O \quad O}{\overset{\| \quad \|}{}} \right]_y \left[ NH(CH-CH_2O)_x-CH_2-CH-NH-C-(CH_2)_4-C \atop CH_3 \qquad \qquad CH_3 \quad \overset{\|}{O} \qquad \overset{\|}{O} \right]_z$$

where x is 3 or greater.

The benefit of the process of the instant invention is in the fact that the polyether amines improve the impact resistance of nylon-6,6.

Examples 1 through 10 and Table I-V record data which demonstrates the preferred method for making polyether polyamide.

The examples are only for the purpose of illustration and are not intended to limit the invention.

EXAMPLE 1

Three parts of nylon-6,6 salt, one part polyoxypropylene diamine 200o (Jeffamine D-2000 amine) and 0.073 parts of adipic acid were heated at 263° C. for two hours. The product was not compatible.

EXAMPLES 2-6

The contents described in the first column of Table I were heated at 260° C. for three hours. These experiments show that the lower molecular weight ether amines were easily compatible with nylon-6,6 polymer.

TABLE I

|  | 1 | 2 | 3 | 4 | 5 | 6 |
|---|---|---|---|---|---|---|
| wt of Nylon-6,6 salt, parts | 2.62 | — | — | — | — | — |
| Diamine, parts | A. 0.16 | B. 0.23 | C. 0.21 | D. 0.78 | E. 1.15 | F. 2.1 |
| Adipic acid, parts | 0.15 | 0.15 | 0.15 | 0.15 | 0.15 | 0.15 |
| Water, parts | 1.0 | 1.0 | 1.0 | 1.0 | 1.0 | 1.0 |
| Compatibility | C | C | C | ? | N.C. | N.C. |

A-(NH$_2$C$_2$CH$_2$CH$_2$CH$_2$)$_2$O
B-NH$_2$(CH$_2$CH$_2$CH$_2$CH$_2$O)$_2$—CH$_2$CH$_2$CH$_2$CH$_2$NH$_2$
C-NH$_2$CH$_2$CH$_2$CH$_2$O—CH$_2$CH$_2$CH$_2$CH$_2$—O CH$_2$CH$_2$CH$_2$NH$_2$
D-NH$_2$—CH$_2$CH$_2$CH$_2$O(CH$_2$CH$_2$CH$_2$CH$_2$O)$_x$—CH$_2$CH$_2$CH$_2$NH$_2$
x — 9,
E — x = 14
F — x = 28

When 2.62 parts of nylon-6,6 salt was heated with 0.40 parts of polyoxypropylene diamine 400 (Jeffamine D-400), and 0.15 parts of adipic acid for 3 hours at 260° C. the product did not appear to be completely homogeneous. However, when the 2 mole adipic acid product of D-400 was prepared and this product was heated with the nylon-6,6 salt and stoichmetric amount of hexamethylene diamine at 260° C. for three hours the product was homogeneous.

TABLE II

Relative Compatibility Polyoxypropylene Diamines with Hexamethylene diamine adipates

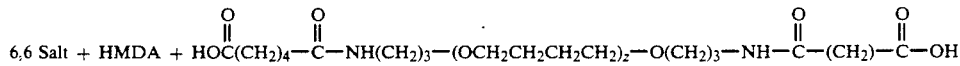

Heated at 260° C. for three hours

| Example 7 | Wt % 6,6 Salt | Wt % Adipic | x[wt. %] | Compatibility |
|---|---|---|---|---|
| Run 1 | 88.5 | 5.1 | 2[6.4] | C |
| Run 2 | 87.3 | 5.0 | 3[7.7] | C |
| Run 3 | 82.7 | 4.7 | 6[12.6] | N.C. |
| Run 4 | 51.2 | 3.4 | 33[45.4] | N.C. |

6,6 Salt and Adipic Acid held constant, 2.62 parts of salt, 0.15 parts of acid, the stoichiometric part of diamine based on dibasic added.

TABLE III

Compatibility of nylon-6,6 with Adipic Acid Amides of Polyoxypropylene Diamine

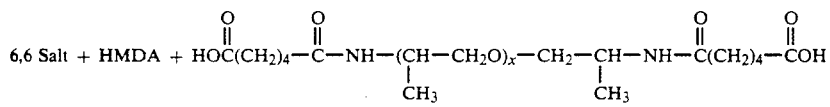

| Example 8 | Wt % 6,6 Salt | Wt % HMDA | x[wt %] | Compatibility |
|---|---|---|---|---|
| Run 13-4 | 72.3 | 1.3 | 33[26.3] | Not Compatible |
| Run 13-5 | 63.6 | 1.8 | 33[34.6] | Not Compatible |
| Run 13-7 | 77.7 | 1.1 | 33[21.2] | Not Compatible |
| Run 13-6 | 30.4 | 3.4 | 33[66.3] | Not Compatible |
| Run 20-1 | 67.7 | 4.7 | 6[27.6] | Compatible |
| Run 20-2 | 51.2 | 7.2 | 6[41.7] | Compatible |
| Run 20-3 | 20.7 | 11.6 | 6[67.6] | Compatible |

TABLE IV

Relative Compatibility of Polyhexamethylene Adipates with Polytetramethylene Glycol Diamine and Adipic Acid
6,6 Salt + $NH_2(CH_2)_y$—(O—$CH_2CH_2CH_2CH_2)_z$—$O(CH_2)_yNH_2$ + Adipic

| Example 9 | Wt % 6,6 Salt | Wt % Adipic Acid | y,z[wt %] | Compatible |
|---|---|---|---|---|
| Run 1 | 89.4 | 5.1 | 4,0[5.5] | Compatible |
| Run 2 | 87.3 | 5.0 | 4,1[7.7] | Compatible |
| Run 3 | 87.9 | 5.0 | 3,1[7.1] | Compatible |
| Run 4 | 73.8 | 4.2 | 3,9[22] | Not Compatible |
| Run 5 | 66.8 | 3.8 | 3,13[29.4] | Not Compatible |
| Run 6 | 53.8 | 3.1 | 3,25[43.1] | Not Compatible |

TABLE V

Relative Compatibility of Hexamethylene Diamine Adipates with Adipic Acid Amides of Polytetramethylene Glycol Diamines 6,6 Salt + HMDA + $HOC(CH_2)_4$—$\overset{O}{\underset{\|}{C}}$—$NH(CH_2)_3$—$(OCH_2CH_2CH_2CH_2)_z$—$O(CH_2)_3$—$NH$—$\overset{O}{\underset{\|}{C}}$—$(CH_2)$—$\overset{O}{\underset{\|}{C}}$—$OH$

| Example 10 | Wt % 6,6 Salt | Wt % HMDA | Z[wt %] | Compatibility |
|---|---|---|---|---|
| Run 15-1 | 36.6 | 6.4 | 9[57] | Compatible |
| Run 15-2 | 72.1 | 2.9 | 9[25] | Not Compatible |
| Run 15-3 | 0 | 10.1 | 9[89.9] | Compatible |
| Run 17-1 | 0 | 9.4 | 13[90.6] | Compatible |
| Run 16-1 | 0 | 4.8 | 25[95.2] | Compatible |

What is claimed is:

1. A method for introducing polyetheramines into a nylon-6,6 polymer which comprises prereacting a polyether diamine having a molecular weight of 190 to 1000 with adipic acid and reacting the adipic acid amide with the salt of nylon-6,6 and hexamethylene diamine to form a homogeneous copolymer.

2. The method of claim 1 wherein the polyether diamine is selected from the group consisting of polyoxypropylenediamines, polybutylene glycol diamines, polytetramethylene glycol diamines and aminopropyl polytetramethylene glycol diamines.

3. The method of claim 1 wherein the method takes place at a temperature of about 240° to about 320° C.

4. The method of claim 1 wherein the process takes place at a pressure of about 0.1 mm to several atmospheres.

5. The method of claim 1 wherein the amount of adipic acid prereacted with the polyether diamine is from 1.5 to 2.1 moles.

6. The method of claim 1 wherein the polyether diamine has a molecular weight of from about 190 to 800.

7. The method of claim 6 wherein the polyether diamine has the formula $NH_2CH(CH_3)CH_2$—$[OCH_2CH(CH_3)]_x$—$NH_2$ where x is about 5.6 and the molecular weight is about 400.

* * * * *